United States Patent [19]

Matsushima et al.

[11] Patent Number: 4,964,141
[45] Date of Patent: Oct. 16, 1990

[54] SERIAL DATA PROCESSOR CAPABLE OF TRANSFERRING DATA AT A HIGH SPEED

[75] Inventors: Osamu Matsushima; Yukio Maehashi, both of Tokyo, Japan

[73] Assignee: NEC Corporation, Tokyo, Japan

[21] Appl. No.: 182,006

[22] Filed: Apr. 15, 1988

[30] Foreign Application Priority Data

Apr. 15, 1987 [JP] Japan ................................. 62-93662

[51] Int. Cl.[5] .............................................. H04L 7/04
[52] U.S. Cl. ...................................... 375/106; 375/36
[58] Field of Search .................. 364/200, 900; 375/36, 375/106, 118, 120, 107; 370/85, 24–29, 85; 340/825.2, 825.21

[56] References Cited

U.S. PATENT DOCUMENTS

| | | | |
|---|---|---|---|
| 4,181,975 | 1/1980 | Jenkins | 375/118 |
| 4,191,849 | 3/1980 | Vrba | 375/106 |
| 4,225,752 | 9/1980 | Looschen | 375/107 |
| 4,429,386 | 1/1984 | Graden | 375/118 |
| 4,475,191 | 10/1984 | James et al. | 375/106 |
| 4,653,074 | 3/1987 | Griffin et al. | 375/106 |
| 4,716,578 | 12/1987 | Wight | 375/106 |
| 4,718,074 | 1/1988 | Mannas et al. | 375/120 |
| 4,847,867 | 7/1989 | Nasu et al. | 375/36 |

*Primary Examiner*—Benedict V. Safourek
*Assistant Examiner*—Stephen Chin
*Attorney, Agent, or Firm*—Foley & Lardner, Schwartz, Jeffery, Schwaab, Mack, Blumenthal & Evans

[57] ABSTRACT

A serial data processor is coupled to a single data line and a single clock line for serial data transfer in synchronism with a clock signal. The data processor comprises a shift register coupled to the serial data line and operated to serially output the data in synchronism with a clock on the clock line, and an output buffer connected to receive the data serially outputted from the shift register and coupled to sequentially output the received data to the data line. This output buffer includes a push-pull driver having an output connected to the data line and an input driven by the data serially outputted from the shift register. A clock counter is coupled to receive the clock on the clock line so as to maintain the push-pull driver in an operable condition until the count value reaches a predetermined value and to bring the output of the push-pull driver into a floating condition after the count value reached a predetermined value. There is provided a data line control circuit coupled to the data line and controlled by the clock counter to bring the data line to a high level after the count value of the clock counter reaches the predetermined value.

18 Claims, 3 Drawing Sheets

SERIAL DATA PROCESSOR CAPABLE OF TRANSFERRING DATA AT A HIGH SPEED

BACKGROUND OF THE INVENTION

1. Field of the Invention

The present invention relates to a serial data processor, and more specifically to a serial data processor having two signal lines capable of serially sending and receiving data through a single data line in synchronism with a clock on a single clock line.

2. Description of Related Art

As means for transferring data between a plurality of semiconductor processor chips such as microprocessors, two methods have been known. A first method is a parallel data transfer which sends and receives data of, for example, eight bits or sixteen bits in a parallel form through a data bus composed of eight or sixteen parallel data signal lines. A second method is a serial data transfer which sends and receives a plurality of bits in series, bit by bit, through a single data signal line. Particularly, the serial data transfer can be carried out with a less number of lines for connecting between chips, and therefore, a required wiring is very simple. In addition, the chip cost is low.

In general, the serial data transfer is carried out by using a single serial data line and a single clock line. In addition, it is a general practice that after a receiving unit has completed reception of a serially transmitted data without fail, it sends a reception acknowledge signal (called a "ACK signal" hereinafter) to a data sending unit in order to ensure and elevate reliability of data transfer. This ACK signal can be sent through a special dedicated line, but this will result in a large increase of wirings in the case that a number of serial data processors are coupled to the same data line and the same clock line. Therefore, it is an ordinary practice to send the ACK signal through the serial data line.

In this case, the serial data line is pulled up through a pull-up resistor, and an output buffer provided in each serial data processor and connected to the serial data line is in an open drain or open collector structure composed of only a pull-down transistor. In this specification, the term "open drain" is used to include the open collector. Thus, when the pull-down transistor is turned on, the serial data line pulled up by the pull-up resistor is brought into a low level by action of the turned-on pull-down transistor, and when the pull-down transistor is turned off, the serial data line is brought into a high level by action of the pull-up resistor. Therefore, the data processor can sequentially send the data by turning on or off the pull-down transistor of the output buffer in accordance with data bits to be sent.

After the completion of data sending, the data sending processor brings the output buffer, namely the pull-down transistor into an off condition so that the serial data line is pulled up to the high level by the pull-up resistor. In this condition, if the data receiving data processor has completed reception of data without fail, it sends the ACK signal of a low level to the serial data line in synchronism with a clock signal on the clock signal line. Namely, the serial data line is pulled down by the data receiving data processor. Thus, the data sending data processor can confirm the safe receipt of the transmission data of the data receiving data processor by detecting the ACK signal i.e., the pull-down of the serial data line which occurs after the data sending processor has brought the serial data line into a high level as the result of the completion of the data transmission.

In the above mentioned serial data processor, the open drain type output buffer operates to bring the serial data line to a low level by dispersing an electric charge on the serial data line to ground through the turned-on output buffer transistor itself. On the other hand, the serial data line is brought to a high level by charging the data line through the pull-up resistor as the result of the turn-off of the output buffer transistor. Since the resistance of the pull-up resistor is considerably larger than that of the turned-on transistor, the rising of the data line to the high level is slower than the falling of the data line to the low level. Because of this, the serial data transfer speed has been limited to a certain value. Specifically, the serial data line of the open drain type can have only a data transfer speed of 100 KHz at maximum. At present, on the other hand, the serial data transfer is about to become dominant because of a great advancement of distributed processing of the multiprocessor type, but application systems using the above mentioned type serial data transfer can have only a limited efficiency.

On the other hand, if the serial data line is driven by an output buffer of the push-pull type, a high speed serial data transfer can be realized. Namely, the output buffer of the push-pull type can pull up the data line to a high level at a high speed. However, in the case that the output buffer of the push-pull type is used, it is not possible to use the data line for sending the ACK signal informing the safe receipt of the transmitted data. Namely, another dedicated line is required for the ACK signal. This is not preferable because limited external terminals of processors are inconveniently used and the signal line wirings become complicated which results in an increased cost of application systems.

SUMMARY OF THE INVENTION

Accordingly, it is an object of the present invention to provide a serial data processor which has overcome the above mentioned defect of the conventional one.

Another object of the present invention is to provide a serial data processor capable of executing a high speed serial data transfer with only a single data line and a single clock line.

A further object of the present invention is to provide a serial data processor capable of executing a high speed serial data transfer through a serial data line and of sending a data reception acknowledge signal through the same serial data line.

The above and other objects of the present invention are achieved in accordance with the present invention by a serial data processor adapted to be coupled to a single data line and a single clock line for serial data transfer in synchronism with a clock signal, comprising a shift register coupled to the serial data line and operated to serially output the data in synchronism with a clock on the clock line, an output buffer connected to receive the data serially outputted from the shift register and coupled to sequentially output the received data to the data line, the output buffer including a push-pull driver having an output connected to the data line and an input driven by the data serially outputted from the shift register, count means coupled to receive the clock signal on the clock line so as to maintain the push-pull driver in an operable condition until the count value reaches a predetermined value and to bring the output of the push-pull driver into a floating condition after the count value reaches a predetermined value, and data line control means coupled to the data line and controlled by the count means to bring the data line to a predetermined logic level after the count value of the count means reaches the predetermined value.

According to another aspect of the present invention there is provided a data transfer system including a pair of data processors coupled to each other through a single serial data line and a single clock line. One of the data processors comprises a serial data terminal coupled to the single serial data line, a clock terminal coupled to the single clock line, a shift register coupled to the serial data terminal and operated to serially output the data in synchronism with a clock on the serial clock terminal, an output buffer connected to receive the data serially outputted from the shift register and coupled to sequentially output the received data to the serial data terminal, the output buffer including a push-pull driver having an output connected to the serial data terminal and an input driven by the data serially outputted from the shift register, count means coupled to receive the clock signal on the clock terminal so as to maintain the push-pull driver in an operable condition until the count value reaches a predetermined value and to bring the output of the push-pull driver into a floating condition after the count value reaches a predetermined value, and pull-up means coupled to the serial data terminal and controlled by the count means to pull up the serial data terminal to a predetermined logic level after the count value of the count means reaches the predetermined value.

In one embodiment of the data transfer system, the push-pull driver includes a p-channel transistor connected at its one end to a high voltage and at its other end to the serial data terminal, and a n-channel transistor connected at its one end to ground and at its other end to the serial data terminal. The output buffer also includes a gate circuit connected between a shift output of the shift register and respective gates of the p-channel and n-channel transistors, the gate circuit being controlled by the count means.

The gate circuit includes a NOR gate having a first input connected to receive the output of the count means and a second input connected to receive the shift output of the shift register. An output of the NOR gate is supplied to the gate of the n-channel transistor. The gate circuit also includes a first NAND gate having a first input connected to receive through an inverter the output of the count means and a second input connected to receive the shift output of the shift register. An output of the NAND gate is supplied to the gate of the p-channel transistor, so that when the count means outputs a low level output signal, the shift output of the shift register is applied through the NAND gate and the NOR gate to the gates of the p-channel and n-channel transistors, respectively, whereby the p-channel and n-channel transistors cooperate to drive the serial data terminal in a push-pull format in accordance with the data serially outputted from the shift output of the shift register, and on the other hand, when the count means outputs a high level output signal as the result of counting of a predetermined number of clocks, the respective outputs of the NAND gate and the NOR gate are locked to a high level and a low level, respectively, whereby the p-channel and n-channel transistors are turned off.

Furthermore, the pull-up means includes a second p-channel transistor connected between a high voltage and the serial data terminal. A gate of the second p-channel transistor is connected to receive the output of the count means so that when the count means outputs the low level output signal, the second p-channel transistor is maintained in an off condition whereby the output buffer is allowed to drive the serial data terminal in accordance with the data serially outputted from the shift output of the shift register, and on the other hand, when the count means outputs the high level output signal as the result of counting of a predetermined number of clocks, the second p-channel transistor is turned on whereby the serial data terminal and hence the single data line is pulled up through the turned-on second p-channel transistor to the high voltage.

In addition, the gate circuit can further include a receiving flag set to a low level when the one data processor is used as a data transmitter and to a high level when the one data processor is used as a data receiver, and a first OR gate having a first input connected to the receiving flag and a second input connected to the output of the count means. An output of the first OR gate is connected to the first input of the NOR gate and an input of the inverter connected to the first input of the first NAND gate.

Furthermore, the gate circuit can further include a data reception acknowledge signal generator operating to supply a low level output when the one data processor is used as a data transmitter and to generate a high level output when the one data processor is used as a data receiver and a safe data reception is confirmed, and a second OR gate having a first input connected to the data reception acknowledge signal generator and a second input connected to the output of the NOR gate. An output of the second OR gate is connected to the gate of the n-channel transistor.

More specifically, the count means has a count input coupled through an input buffer to the clock terminal. The data processor further includes an internal clock generator supplying a clock through a tristate buffer to the clock terminal, and a clock selection flag connected to a control input of the tristate buffer so as to maintain the tristate buffer in an operable condition when the internal clock is selected and to put the tristate buffer into a high impedance condition when an external clock is selected.

In addition, the data processor further includes a second input buffer having an input connected to the data terminal and an output connected to a serial data input of the shift register. There is provided an reception acknowledge signal detector having an input connected to the output of the second input buffer.

The above and other objects, features and advantages of the present invention will be apparent from the following description of preferred embodiments of the invention with reference to the accompanying drawings.

DESCRIPTION OF THE PREFERRED EMBODIMENT

Figure 1:
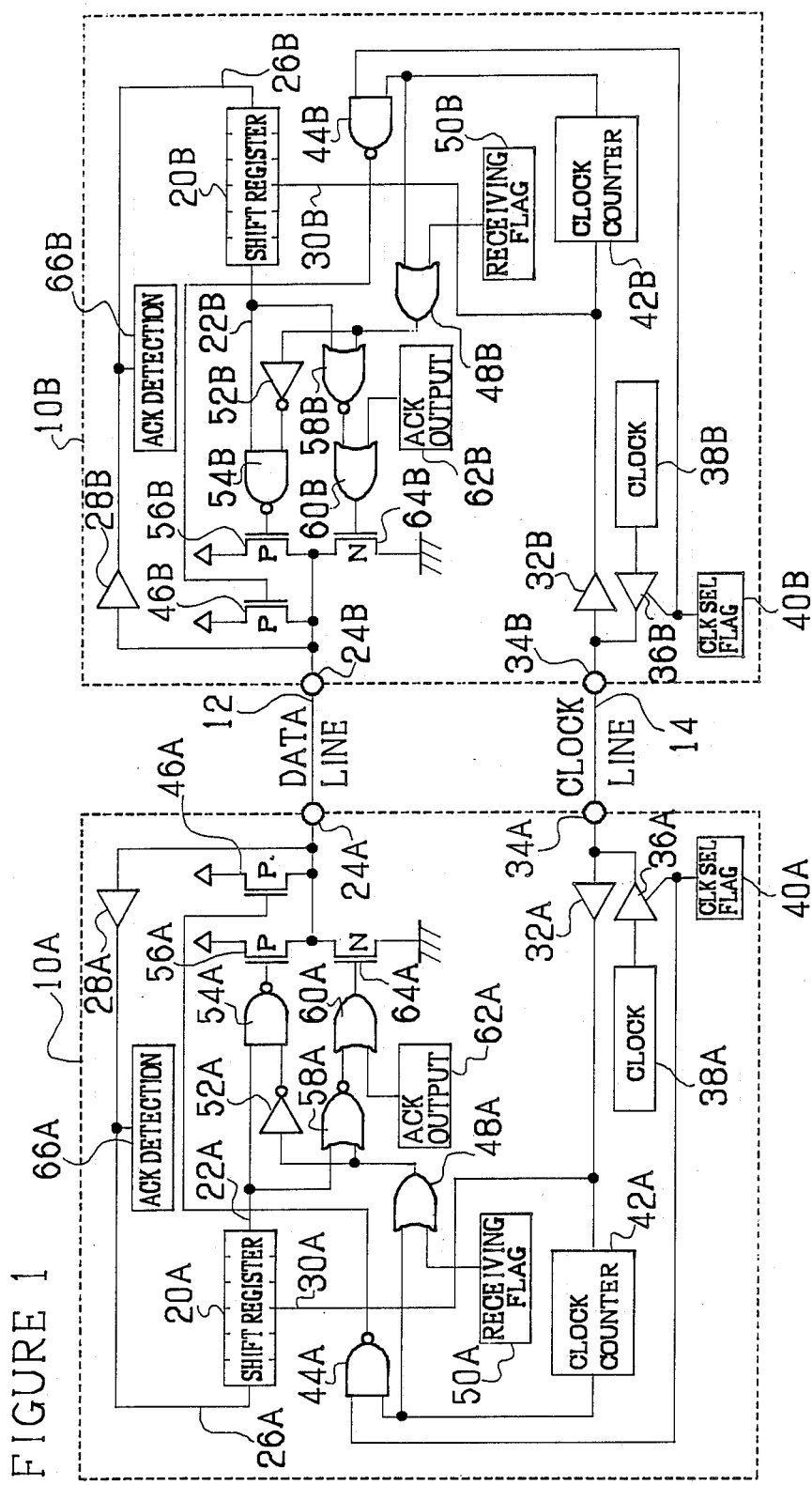
FIG. 1 is a block diagram of one embodiment of the serial data processor in accordance with the present invention.

Referring to FIG. 1, there is shown a data transfer system including a pair of serial data processors in accordance with the present invention. The shown system includes first and second serial data processors 10A and 10B coupled to each other through a single serial data line 12 and a single clock line 14. These serial data processors 10A and 10B have the same construction, and therefore, the same Reference Numerals will be given the same or corresponding elements of the serial data processors 10A and 10B. But, for distinction between the serial data processors 10A and 10B, a capital alphabet "A" is added to all Reference Numerals given for the elements of the serial data processor 10A and a capital alphabet "B" is added to all Reference Numerals given for the elements of the serial data processor 10B.

Now, the construction of only the serial data processor 10A will be explained, since the serial data processors 10A and 10B have the construction as mentioned above. The serial data processor 10A includes a shift register 20A of eight bits which is adapted to send and receive an eight bit parallel data to and from a data processing unit (not shown). This shift register 20A has a serial data output 22A coupled through an output buffer (which will be explained hereinafter) to a serial data terminal 24A connected to the serial data line 12. The shift register 20A also has a serial data input 26A connected to an output of an input buffer 28A whose input is connected to the serial data terminal 24A. Further, the shift register 20A includes a clock input 30A connected to an output of another input buffer 32A, an input of which is connected to a clock terminal 34A connected to the clock line 14.

The input of the input buffer 32A is also connected to an output of a tristate buffer 36A, whose input is connected to receive a clock signal from an internal clock generator 38A provided in the serial data processor. The tristate buffer 36A is controlled by an associated clock selection flag 40A, so that when the internal clock generator 38A is used, the tristate buffer 36A is put in an operable condition, and when an external clock signal sent through the clock line 14 is used, the tristate buffer 36A is put in a high impedance condition.

The output of the input buffer 32A is also connected to a clock counter 42A adapted to output a high level count-up signal when eight clock pulses are counted. An output of the clock counter 42A is connected to one input of NAND gate 44A, which is connected at the other input thereof to the clock selection flag 40A. An output of the NAND gate 44A is connected to a gate of a p-channel transistor 46A connected between the data terminal 24A and a high voltage source. This transistor 46A functions as a pull-up transistor of the open drain type.

Further, the output of the clock counter 42A is connected to one input of an OR gate 48A whose other input is connected to a receiving flag 50A. This receiving flag 50A outputs a high level signal when the data processor 10A should be in a data receiving condition and a low level when the data processor 10A should be in a data transmitting condition. An output of the OR gate 48A is connected through an inverter 52A to one input of a NAND gate 54A. This NAND gate 54A has the other input connected to the serial data output 22A of the shift register 20A and an output connected to a gate of a p-channel transistor 56A connected between the data terminal 24A and a high voltage source. In addition, the output of the OR gate 48A is connected to one input of a NOR gate 58A which is also connected at its other input to the serial data output 22A of the shift register 20A. An output of this NOR gate 58A is connected to one input of an OR gate 60A having the other input thereof connected to an ACK signal generator 62A. This ACK signal generator 62A is controlled by the data processing unit (not shown) to generate an ACK signal when the data processor 10A has safely received a serial data transmitted from another data processor. An output of this OR gate 60A is connected to a gate of a n-channel transistor 64A connected between the data terminal 24A and ground. Thus, the p-channel transistor 56A and the n-channel transistor 64A cooperate to form a push-pull type output driver.

In addition, the output of the input buffer 28A is connected to an ACK signal detector 66A.

Next, there will be explained an operation of the above mentioned data transfer system in the case that the data processor 10A functions as a serial data transmitter and the data processor 10B functions as a serial data receiver. Here assume that the shift register 20A is loaded with an eight bits of data to be sent, and the clock selection flag 40A is set to a high level so as to bring the associated tristate buffer 36A in the operable condition so that the internal clock source 38A is selected. In addition, the receiving flag 50A is set at a low level. On the other hand, the clock selection flag 40B of the data processor 10B is set to a low level so as to bring the associated tristate buffer 36B in a high impedance condition so that the external clock sent through the clock line 14 is selected and supplied to various portions of the data processor 10B. The receiving flag 50B is set at a high level. As a result, the OR gate 48B outputs the high level signal, so that a high level signal is applied to the gate of the p-channel transistor 54B so as to maintain the transistor 54B in an off condition, and a low level signal is applied to the gate of the n-channel transistor 64B so as to maintain the transistor 64B in an off condition. Namely, the output buffer of the data processor 10B is in an inoperable condition or in a floating condition. Further, since the clock selection flag 40B is in a low level condition, the NAND gate 44B outputs a high level signal to the gate of the p-channel transistor 46B so as to maintain the transistor 46B in an off condition. Thus, the level of the data terminal 24B will change dependently upon the level of the data line 12.

In this condition, the clock generated by the clock generator 38A is supplied to the clock counter 42A and the shift register 20A and also through the clock line 14, the clock terminal 34B and the input buffer 32B to the shift register 20B and the clock counter 42B. In synchronism with the clock, the shift register 20B shifts the data held therein and outputs the data bit by bit from the data output 22A.

At this time, since the receiving flag 50A is at the low level and the output of the clock counter 42A is also at the low level, the output of the OR gate 48A is at a low level. Therefore, the inverter 52A maintains the one input of the NAND gate 54A at the high level, so that the NAND gate 54A assumes as an inverter and drives the p-channel transistor 56A with an inverted signal of the bit data outputted from the shift register 20A.

On the other hand, since the OR gate 48A outputs the low level, the NOR gate 58A assumes as an inverter for the output of the shift register 20A. At this time, the output of the ACK signal generator 62A is at the low level as mentioned above. Therefore, the output of the NOR gate 58A will pass through the OR gate 60A without change. Namely, the NOR gate 58A and the OR gate 60A cooperate to drive the n-channel transistor 64A with an inverted signal of the bit data outputted from the shift register 20A.

Figure 2:
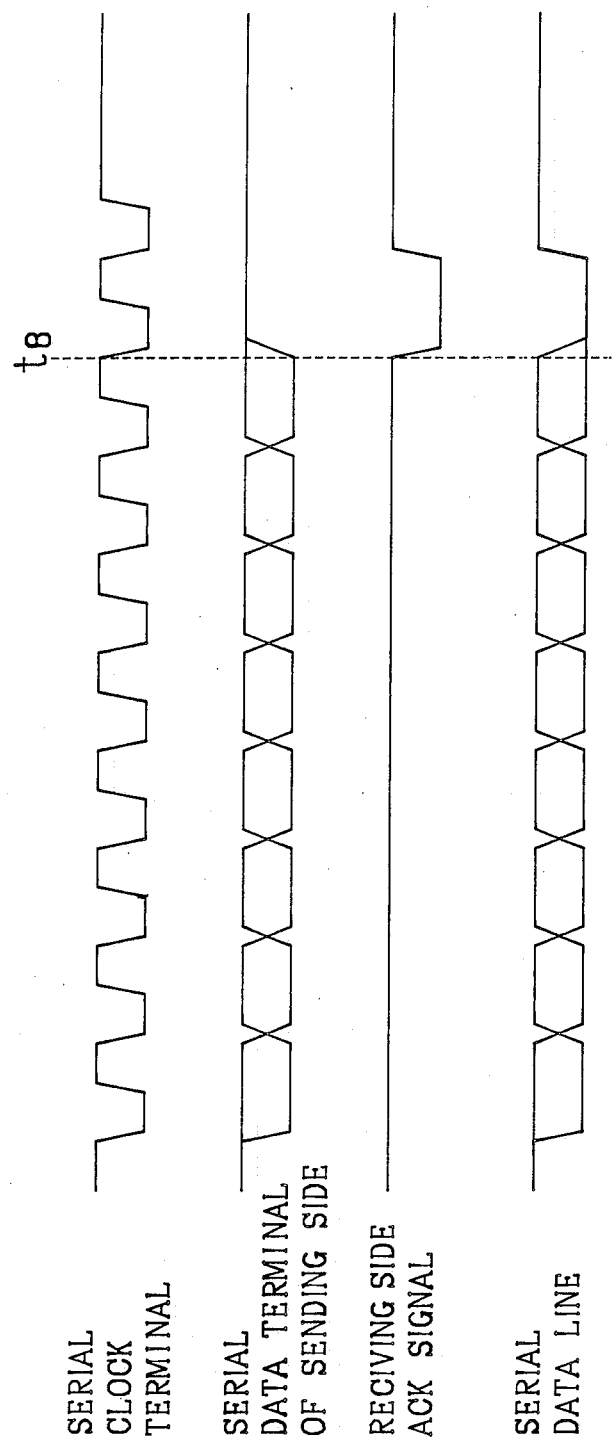
FIG. 2 is a timing chart of one operation mode of the data processor shown in FIG. 1.

Accordingly, when the output 22A of the shift register 20A is at a high level, the p-channel transistor 56A is turned on and the n-channel transistor 64A is turned off. On the other hand, when the output 22A of the shift register 20A is at a low level, the p-channel transistor 56A is turned off and the n-channel transistor 64A is turned on. Namely, the p-channel transistor 56A and the n-channel transistor 64A ceaselessly assume different conditions opposite to each other, and therefore, realize a push-pull drive for the data terminal 24A. Thus, the shift register 20A outputs the data held therein, bit by bit, in synchronism to the clock, and the sequentially outputted data bits are outputted to the data terminal 24A through the output buffer composed of the p-channel transistor 56A and the n-channel transistor 64A, as mentioned above. An uppermost waveform chart and a second waveform chart shown in FIG. 2 indicate the clock appearing on the clock line 14 and the condition of the data terminal 24A, respectively.

As mentioned above, since the push-pull drive is used for driving the data terminal 24A and hence the serial data line 12, not only a falling transition from the high level to the low level but also a rising transition from the low level to the high level can be speeded up. Accordingly, the serial data transfer is speeded up to 1 MHz, for example.

Until the eight bit data is shifted out from the shift register 20A, the clock counter 42A maintains its output at a low level. Therefore, the NAND gate 44A outputs a high level signal to the gate of the p-channel transistor 46A so that the p-channel transistor 46A is maintained in an off condition. Namely, the transistor 46A assumes as a high resistance pull-up resistor. Therefore, even if the output data of the shift register 20A is at a low level, no current will flow through the transistor 46A and the transistor 64A.

In the serial data processor 10B, on the other hand, the serial data outputted to the data line 12 as mentioned above is inputted to the data terminal 24B and sent through the input buffer 28B to the shift register 20B, and the serial clock signal inputted to the clock terminal 34B is fed through the input buffer 32B to the clock input of the shift register 20B. Thus, the serial data is serially inputted to the shift register 20B in synchronism to the clock. At this time, as mentioned above, since the receiving flag 50B is at the high level, the transistors 56B and 64B are in an off condition. In addition, since the clock selection flag 40B is at a low level, the NAND gate 44B outputs the high level signal to the p-channel transistor 46B. Therefore, the transistor 46B is maintained in an off condition. Therefore, the data processor 10B will not drive the data line 12.

When the clock counter 42A counts the eight serial clocks, it changes its output to a high level. As a result, the output of the OR gate 48A is brought into a high level, which causes the NOR gate 58A to unconditionally assume the low level output. Since the data transmitting processor does not perform the ACK control, the ACK signal generator 62A maintains its output at a low level. Accordingly, the output of the OR gate 60A is brought into a low level so that the n-channel transistor 64A is turned off. On the other hand, the output of the NAND gate 54A is unconditionally brought into a high level, which puts the p-channel transistor 56A in an off condition. Namely, the output buffer composed of the transistors 56A and 64A assumes a high impedance condition or a floating condition. Thus, the serial data line is put in a condition that it is not driven by the data processor 10A. In addition, at this time, the high level output of the clock counter 42A brings the output of the NAND gate 44A into a high level, which turns on the p-channel transistor 46A so that the data terminal 24A and hence the data line 12 is pulled up to a high level by action of the turned-on transistor 46A. See a timing t8 portion of the second waveform chart shown in FIG. 2.

On the other hand, the data receiving data processor 10B examines whether or not the transmitted data is safely received. If the safe reception is confirmed, the ACK signal generator 62B brings its output to a high level. As a result, the n-channel transistor 64B is turned on, so that an ACK signal is outputted to the data terminal 24B as shown in a third waveform chart shown in FIG. 2. Namely, the data line 12 is pulled down by the turned-on transistor 64B. Accordingly, a low level ACK signal appears on the data line 12 after the timing t8 as shown in a lowermost waveform chart of FIG. 2.

This ACK signal is sent through the data terminal 24A and the input buffer 28A to the ACK detector 66A. Thus, it is confirmed by the data sending data processor 10A that the transmitted data is safely received by the data receiving data processor 10B. The ACK detector 66A responds to the ACK signal to allow the data processor 10A to send the next eight bits of data.

In the above mentioned embodiment, the data sending data processor 10A sends the clock signal to the data receiving data processor 10B. But, the data receiving data processor 10B can send the clock to the data sending data processor 10A by setting the clock selection flag 40A to a low level and the clock selection flag 40B to a high level. In this case, the serial clock line 14 is driven by the receiving data processor 10B and the serial data line 12 is pulled up by the receiving data processor 10B after completion of transmission of a unitary data of eight bits from the processor 10A to the processor 10B. But, the other matters of the operation will be same as the above mentioned case.

The above mentioned embodiment is in accordance with a protocol in that an ACK signal is outputted in synchronism with a falling of a serial clock received just after the data of eight bits has been received. However, it can be modified to comply with a second protocol in that an ACK signal is not outputted just after the data of eight bits has been received but outputted after a short delay from the reception of the transmitted data.

Figure 3:
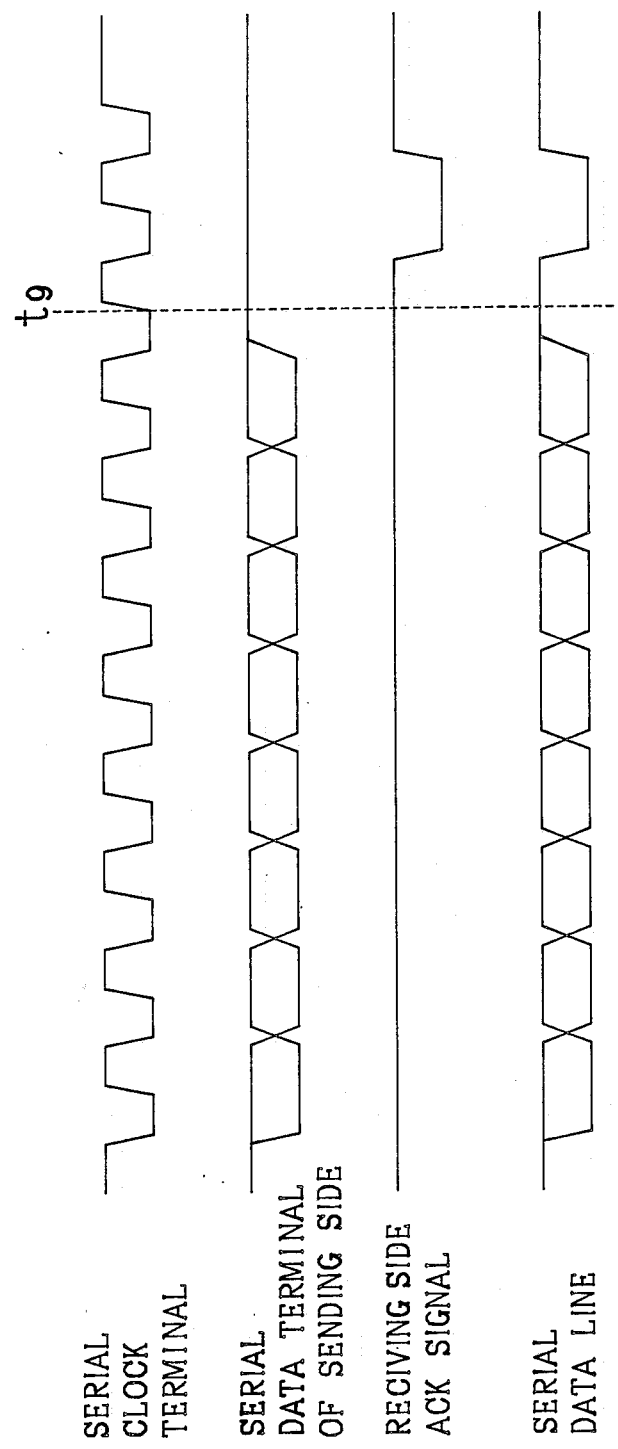
FIG. 3 is a timing chart similar to FIG. 2 but showing another operation mode of the data processor shown in FIG. 1.

This second protocol data transfer can be realized in the data transfer system shown in FIG. 1. In the case of the second protocol, the clock counter 42A is modified to output a high level when nine clock signals are counted. Therefore, as shown in FIG. 3, the output buffer of the data processor 10A drives the data terminal 24A in the push-pull format until a timing t9. Therefore, the data terminal 24A and hence the data line 12 are pulled up to the high level after the eight bit data has been transmitted. Because the shift register will output a high level signal after all the data bits are shifted out. Thereafter, the two transistors 56A and 64A of the output buffer are turned off in response to the high level output of the clock counter 42A which is generated at the timing t9. At this time, the output of the NAND gate 44A is brought into a low level so that the transistor 46A is turned on to maintain the data line 12 in the pull-up condition. On the other hand, the data receiving data processor 10B generates the ACK signal at the timing t9 in synchronism with a falling of the serial clock.

Namely, by changing the count number of the clock counter, the system can be modified to comply a different protocol.

In addition, the above mentioned embodiment, the reception acknowledge signal is sent through the serial data line. But, if the clock line is made in an open drain structure, the reception acknowledge signal can be sent through the clock line.

As seen from the above explanation, the serial data processor drives the serial data line in a push-pull manner when the data should be sent in a serial format through the serial data line. Therefore, the data can be sent at a high speed. On the other hand, after completion of the serial data transmission, the push-pull drive is put in an inoperable or high impedance condition, and at the same time, the serial data line is immediately pulled up. Therefore, it is possible to send a reception acknowledge signal through the serial data line.

The invention has thus been shown and described with reference to the specific embodiments. However, it should be noted that the present invention is in no way limited to the details of the illustrated structures but changes and modifications may be made within the scope of the appended claims.

We claim:

1. A serial data processor adapted to be coupled to a single data line and a single clock line for serial data transfer in synchronism with a clock signal, comprising a shift register coupled to the single data line and operated to serially output the data in synchronism with a clock signal on the clock line, an output buffer connected to receive the data serially outputted from the shift register and coupled to sequentially output the received data to the data line, the output buffer including a push-pull driver having an output connected to the data line and an input driven by the data serially outputted from the shift register, count means coupled to receive the clock signal on the clock line so as to maintain the push-pull driver in an operable condition until the count value reaches a predetermined value and to bring the output of the push-pull driver into a floating condition after the count value reaches a predetermined value, and data line control means coupled to the data line and controlled by the count means to bring the data line to a predetermined logic level after the count value of the count means reaches the predetermined value.

2. A data processor claimed in claim 1 wherein the push-pull driver includes a p-channel transistor connected at its one end to a high voltage and at its other end to a data terminal connected to the serial data line, and a n-channel transistor connected at its one end to ground and at its other end to the data terminal, and the output buffer also includes a gate circuit connected between a shift output of the shift register and respective gates of the p-channel and n-channel transistors, the gate circuit being controlled by the count means.

3. A data processor claimed in claim 2 wherein the gate circuit includes a NOR gate having a first input connected to receive the output of the count means and a second input connected to receive the shift output of the shift register, an output of the NOR gate being supplied to the gate of the n-channel transistor, and a first NAND gate having a first input connected to receive through an inverter the output of the count means and a second input connected to receive the shift output of the shift register, an output of the NAND gate being supplied to the gate of the p-channel transistor, so that when the count means outputs a low level output signal, the shift output of the shift register is applied through the NAND gate and the NOR gate to the gates of the p-channel and n-channel transistors, respectively, whereby the p-channel and n-channel transistors cooperate to drive the data terminal in a push-pull format in accordance with the data serially outputted from the shift output of the shift register, and on the other hand, when the count means outputs a high level output signal as the result of counting of a predetermined number of clocks, the respective outputs of the NAND gate and the NOR gate are locked to a high level and a low level, respectively, whereby the p-channel and n-channel transistors are turned off.

4. A data processor claimed in claim 3 wherein the data line control means includes a second p-channel transistor connected between a high voltage and the data terminal, a gate of the second p-channel transistor being connected to receive the output of the count means so that when the count means outputs the low level output signal, the second p-channel transistor is maintained in an off condition whereby the output buffer is allowed to drive the data terminal in accordance with the data serially outputted from the shift output of the shift register, and on the other hand, when the count means outputs the high level output signal as the result of counting of a predetermined number of clocks, the second p-channel transistor is turned on whereby the data terminal and hence the single data line is pulled up through the turned-on second p-channel transistor to the high voltage.

5. A data processor claimed in claim 4 wherein the gate circuit further includes a receiving flag set to a low level when the data processor is used as a data transmitter and to a high level when the data processor is used as a data receiver, and a first OR gate having a first input connected to the receiving flag and a second input connected to the output of the count means, an output of the first OR gate being connected to the first input of the NOR gate and an input of the inverter connected to the first input of the first NAND gate.

6. A data processor claimed in claim 5 wherein the gate circuit further includes a data reception acknowledge signal generator operating to supply a low level output when the data processor is used as a data transmitter and to generate a high level output when the data processor is used as a data receiver and a safe data reception is confirmed, and a second OR gate having a first input connected to the data reception acknowledge signal generator and a second input connected to the output of the NOR gate, an output of the second OR gate being connected to the gate of the n-channel transistor.

7. A data processor claimed in claim 6 wherein the count means has a count input coupled through an input buffer to a clock terminal coupled to the clock line, and further including an internal clock generator supplying a clock through a tristate buffer to the clock terminal, and a clock selection flag connected to a control input of the tristate buffer so as to maintain the tristate buffer in an operable condition when the internal clock is selected and to put the tristate buffer into a high impedance condition when an external clock is selected.

8. A data processor claimed in claim 7 further including a second input buffer having an input connected to the data terminal and an output connected to a serial data input of the shift register.

9. A data processor claimed in claim 8 further including an reception acknowledge signal detector having an input connected to the output of the second input buffer.

10. A data transfer system including a pair of data processors coupled to each other though a single serial data line and a single clock line, each of the data processors comprising a serial data terminal coupled to the single serial data line, a clock terminal coupled to the single clock line, a shift register coupled to the serial data terminal and operated to serially output the data in synchronism with the clock signal on the serial clock terminal, an output buffer connected to receive the data serially outputted from the shift register and coupled to sequentially output the received data to the serial data terminal, the output buffer including a push-pull driver having an output connected to the serial data terminal and an input driven by the data serially outputted from the shift register, count means coupled to receive the clock signal on the clock terminal so as to maintain the push-pull driver in an operable condition until the count value reaches a predetermined value and to bring the output of the push-pull driver into a floating condition after the count value reaches a predetermined value, and pull-up means coupled to the serial data terminal and controlled by the count means to pull up the serial data terminal to a predetermined logic level after the count value of the count means reaches the predetermined value.

11. A data transfer system claimed in claim 10 wherein the push-pull driver includes a p-channel transistor connected at its one end to a high voltage and at its other end to the serial data terminal, and a n-channel transistor connected at its one end to ground and at its other end to the serial data terminal, and the output buffer also includes a gate circuit connected between a shift output of the shift register and respective gates of the p-channel and n-channel transistors, the gate circuit being controlled by the count means.

12. A data transfer system claimed in claim 11 wherein the gate circuit includes a NOR gate having a first input connected to receive the output of the count means and a second input connected to receive the shift output of the shift register, an output of the NOR gate being supplied to the gate of the n-channel transistor, and a first NAND gate having a first input connected to receive through an inverter the output of the count means and a second input connected to receive the shift output of the shift register, an output of the NAND gate being supplied to the gate of the p-channel transistor, so that when the count means outputs a low level output signal, the shift output of the shift register is applied through the NAND gate and the NOR gate to the gates of the p-channel and n-channel transistors, respectively, whereby the p-channel and n-channel transistors cooperate to drive the serial data terminal in a push-pull format in accordance with the data serially outputted from the shift output of the shift register, and on the other hand, when the count means outputs a high level output signal as the result of counting of a predetermined number of clocks, the respective outputs of the NAND gate and the NOR gate are locked to a high level and a low level, respectively, whereby the p-channel and n-channel transistors are turned off.

13. A data transfer system claimed in claim 12 wherein the pull-up means includes a second p-channel transistor connected between a high voltage and the serial data terminal, a gate of the second p-channel transistor being connected to receive the output of the count means so that when the count means outputs the low level output signal, the second p-channel transistor is maintained in an off condition whereby the output buffer is allowed to drive the serial data terminal in accordance with the data serially outputted from the shift output of the shift register, and on the other hand, when the count means outputs the high level output signal as the result of counting of a predetermined number of clocks, the second p-channel transistor is turned on whereby the serial data terminal and hence the single data line is pulled up through the turned-on second p-channel transistor to the high voltage.

14. A data transfer system claimed in claim 13 wherein the gate circuit further includes a receiving flag set to a low level when the one data processor is used as a data transmitter and to a high level when the one data processor is used as a data receiver, and a first OR gate having a first input connected to the receiving flag and a second input connected to the output of the count means, an output of the first OR gate being connected to the first input of the NOR gate and an input of the inverter connected to the first input of the first NAND gate.

15. A data transfer system claimed in claim 14 wherein the gate circuit further includes a data reception acknowledge signal generator operating to supply a low level output when the one data processor is used as a data transmitter and to generate a high level output when the one data processor is used as a data receiver and a safe data reception is confirmed, and a second OR gate having a first input connected to the data reception acknowledge signal generator and a second input connected to the output of the NOR gate, an output of the second OR gate being connected to the gate of the n-channel transistor.

16. A data transfer system claimed in claim 15 wherein the count means has an count input coupled through an input buffer to the clock terminal, and the one data processor further includes a internal clock generator supplying a clock through a tristate buffer to the clock terminal, and a clock selection flag connected to a control input of the tristate buffer so as to maintain the tristate buffer in an operable condition when the internal clock is selected and to put the tristate buffer into a high impedance condition when an external clock is selected.

17. A data transfer system claimed in claim 16 further including a second input buffer having an input connected to the data terminal and an output connected to a serial data input of the shift register.

18. A data transfer system claimed in claim 17 further including an reception acknowledge signal detector having an input connected to the output of the second input buffer.

* * * * *